United States Patent
Kobayashi

(10) Patent No.: US 7,953,272 B2
(45) Date of Patent: May 31, 2011

(54) IMAGE PROCESSOR, IMAGE PROCESSING METHOD AND COMPUTER READABLE MEDIUM FOR IMAGE PROCESSING PROGRAM

(75) Inventor: Masanobu Kobayashi, Shiojiri (JP)

(73) Assignee: Seiko Epson Corporation (JP)

( * ) Notice: Subject to any disclaimer, the term of this patent is extended or adjusted under 35 U.S.C. 154(b) by 644 days.

(21) Appl. No.: 12/100,623

(22) Filed: Apr. 10, 2008

(65) Prior Publication Data

US 2008/0253646 A1 Oct. 16, 2008

(30) Foreign Application Priority Data

Apr. 11, 2007 (JP) ................. 2007-103668

(51) Int. Cl.
*G06K 9/00* (2006.01)

(52) U.S. Cl. ......... 382/162; 382/165; 382/166; 382/167

(58) Field of Classification Search .......... 382/166, 382/162, 167, 274, 117, 165, 155; 250/205; 315/82; 356/239.1, 240.1; 348/190, 191; 351/205; 430/302
See application file for complete search history.

(56) References Cited

U.S. PATENT DOCUMENTS

| | | | |
|---|---|---|---|
| 6,523,954 B1 * | 2/2003 | Kennedy et al. | 351/205 |
| 6,859,270 B2 * | 2/2005 | Werzinger et al. | 356/239.1 |
| 7,639,277 B2 * | 12/2009 | Shibuya et al. | 348/190 |

FOREIGN PATENT DOCUMENTS

| | | |
|---|---|---|
| JP | 7-131718 | 5/1995 |
| JP | 2000-078594 | 3/2000 |
| JP | 2004-064165 | 2/2004 |
| JP | 2004-266347 | 9/2004 |
| JP | 2005-072965 | 3/2005 |

* cited by examiner

*Primary Examiner* — Anh Hong Do

(74) *Attorney, Agent, or Firm* — Harness, Dickey & Pierce, P.L.C.

(57) ABSTRACT

An image processor is the image processor generating composed image data by composite image data of plural images taken with different exposures, which includes an image data acquisition unit that acquires image data of images taken with different exposures, a reliability evaluation unit that evaluates the reliability of image data having different exposures acquired by the image acquisition unit, in which the image data acquired by the image acquisition unit includes image data of plural color components, according to image data of plural color components included in the image data, a color selection unit that selects image data of each color component from any of image data of plural images having different exposures based on the reliability obtained from the result of evaluation by the reliability evaluation unit and a composite unit that generates the composed image data by composite image data of respective color components selected by the color selection unit in the image data.

5 Claims, 7 Drawing Sheets

IMAGE PROCESSOR, IMAGE PROCESSING METHOD AND COMPUTER READABLE MEDIUM FOR IMAGE PROCESSING PROGRAM

BACKGROUND

1. Technical Field

The invention relates to an image processor, an image processing method and a computer readable medium for an image processing program, and particularly relates to the image processor performing image processing for obtaining color images and the image processing method and the computer readable medium for the image processing program applied to the image processor.

2. Related Art

The exposure when taking images is an important factor for determining quality of taken images. When taking images by setting the unsuitable exposure, there is a case in which it is difficult to discriminate a subject of the taken image because the subject is filled with black in the image though it can be seen and recognized by human eyes. Conversely, there is a case in which so-called overexposure occurs because reflected light is imaged in white in the image. Also in such case, it is sometimes difficult to discriminate a subject of the taken image.

As a related art for solving the problems and generating images having high image quality, it can be considered that plural images having different exposures and having suitable brightness are cut out and composed to form a piece of image. However, since the luminance levels of images to be composed are different in the image composite, there has been a problem that an image of a false contour appears at a boundary of composite in the image obtained by the composite.

As a related art for preventing the occurrence of the false contour, in JP-A-7-131718, when plural images having different exposures are composed, the luminance levels of plural images are allowed to correspond to one another by allowing luminance levels of images having suitable brightness (not underexposure) respectively in plural images to correspond to one another.

In the invention of JP-A-2000-78594, a circuit scale used in image composite is reduced by composite luminance of plural images before separating color.

However, image composite has a problem that it is difficult to reproduce the chroma of images appropriately in addition to the problem of the false contour. Both JP-A-7-131718 and JP-A-2000-78594 address overexposure or underexposure of images by adjusting the luminance level, which does not solve the deterioration of the chroma.

FIG. 9A and FIG. 9B are views for explaining the deterioration of the chroma in the composed image. FIG. 9A and FIG. 9B show luminance signal levels in the vertical axis with respect to respective image data of color components R,G and B forming orange image data. The maximum value of luminance signal levels is 255. The exposures in the image data shown in FIG. 9A and FIG. 9B are different from one another, and image data shown in FIG. 9A is the image data of an image exposed in time shorter than an image shown in FIG. 9B.

In the image data shown in FIG. 9A, a value of image data of the B component in respective image data of R, G and B is approximately 10% of 255. In such case, noise and the like greatly affect the value of image data of B component, therefore, it is difficult to obtain sufficient reliability. On the other hand, in the image data shown in FIG. 9B, values of images of the R component and the G component in respective image data of R, G and B exceed the maximum value and saturated. Accordingly, it is difficult to obtain sufficient reliability concerning whether the hue of the image data shown in FIG. 9B is appropriate or not.

Accordingly, it is difficult to generate a composed image which reproduces the hue of the image appropriately by switching image data having different exposures shown in FIG. 9A and FIG. 9B in any manner in the related art.

SUMMARY

An object of the invention is to provide an image processor, an image processing method and a computer readable medium for an image processing program capable of generating images having appropriate hue.

An image processor according to the invention is the image processor generating composed image data by composite image data of plural images taken with different exposures, which includes an image data acquisition unit that acquires image data of images taken with different exposures, a reliability evaluation unit that evaluates the reliability of image data having different exposures acquired by the image acquisition unit, in which the image data acquired by the image acquisition unit includes image data of plural color components, according to image data of plural color components included in the image data, a color selection unit that selects image data of each color component from any of image data of plural images having different exposures based on the reliability obtained as a result of evaluation by the reliability evaluation unit, and a composite unit that generates the composed image data by composite image data of respective color components selected by the color selection unit in the image data.

According to the invention, the reliability of image data of images taken with different exposures as well as image data including plural color components can be evaluated according to the color components. It is also possible to generate composed image data by selecting image data of each color component from any of image data of plural images having different exposures based on the evaluated reliability and composite image data of the selected respective color components. Accordingly, the composed image data can be generated by applying luminance signal levels which are considered to be appropriate with respect to respective color components of image data. The above invention can provide an image processor capable of generating composed image data having appropriate hue.

In the image processor according to the invention, the color selection unit selects image data of the same color component from respective image data having different exposures based on the reliability obtained as a result of evaluation by the reliability evaluation unit, and the image processor further includes a mixing ratio determining unit that determines the mixing ratio of plural image data of the same color component selected by the color selection unit, in which the composite unit composes plural image data of the same color component in accordance with the mixing ratio determined by the mixing ratio determining unit.

According to the invention, image data of the same component is respectively selected from plural image data having different exposures and composed at a mixing ratio based on the reliability, thereby generating composed image data of this color component. Accordingly, it is possible to provide an image processor which is not liable to be affected by noise when comparing with the case of applying image data of color components not having sufficient reliability due to the noise of signals.

The image processor according to the invention further includes a normalization unit that normalizes image data of respective color components acquired by the image data acquisition unit and the composite unit composes image data normalized by the normalization unit.

According to the invention, the effect of respective image data having different exposures with respect to composed image data can be made equal, thereby generating composed image data having more appropriate hue.

According to the invention, a image processing method generating composed image data by composite image data of plural images taken with different exposures is the image processing method including an image data acquisition step of acquiring image data of images taken with different exposures, a reliability evaluation step of evaluating the reliability of image data having different exposures acquired by the image acquisition step, in which the image data acquired by the image acquisition step includes image data of plural color components, according to image data of plural color components included in the image data, a color selection step of selecting image data of each color component from any of image data of plural images having different exposures based on the reliability obtained as a result of evaluation by the reliability evaluation step, and a composite step of generating the composed image data by composite image data of respective color components selected by the color selection step in the image data.

According to the invention, the reliability of image data of images taken with different exposures as well as image data including plural color components can be evaluated according to the color components. It is also possible to generate composed image data by selecting image data of each color component from any of image data of plural images having different exposures based on the evaluated reliability and composite image data of the selected respective color components. Accordingly, the composed image data can be generated by applying luminance signal levels which are considered to be appropriate with respect to respective color components of image data. The above invention can provide an image processing method capable of generating composed image data having appropriate hue.

A computer readable medium for an image processing program according to the invention is the computer readable medium for the image processing program for allowing a computer to perform image processing generating composed image data by composite image data of plural images taken with different exposures, which allows the computer to execute an image acquisition function acquiring image data of images taken with different exposures, a reliability evaluation function evaluating the reliability of image data having different exposures acquired by the image acquisition function, in which the image data acquired by the image acquisition function includes image data of plural color components, according to image data of plural color components included in the image data, a color selection function selecting image data of each color component from any of image data of plural images having different exposures based on the reliability obtained as a result of evaluation by the reliability evaluation function, and a composite function generating the composed image data by composite image data of respective color components selected by the color selection function in the image data.

According to the invention, the reliability of image data of images taken with different exposures as well as image data including plural color components can be evaluated according to the color components. It is also possible to generate composed image data by selecting image data of each color component from any of image data of plural images having different exposures based on the evaluated reliability and composite image data of the selected respective color components. Accordingly, the composed image data can be generated by applying luminance signal levels which are considered to be appropriate with respect to respective color components of image data. The above invention can provide a computer readable medium for an image processing program capable of generating composed image data having appropriate hue.

DESCRIPTION OF EXEMPLARY EMBODIMENTS

Hereinafter, Embodiment 1 and Embodiment 2 according to the present invention will be explained with reference to the drawings.

Embodiment 1

Figure 1:
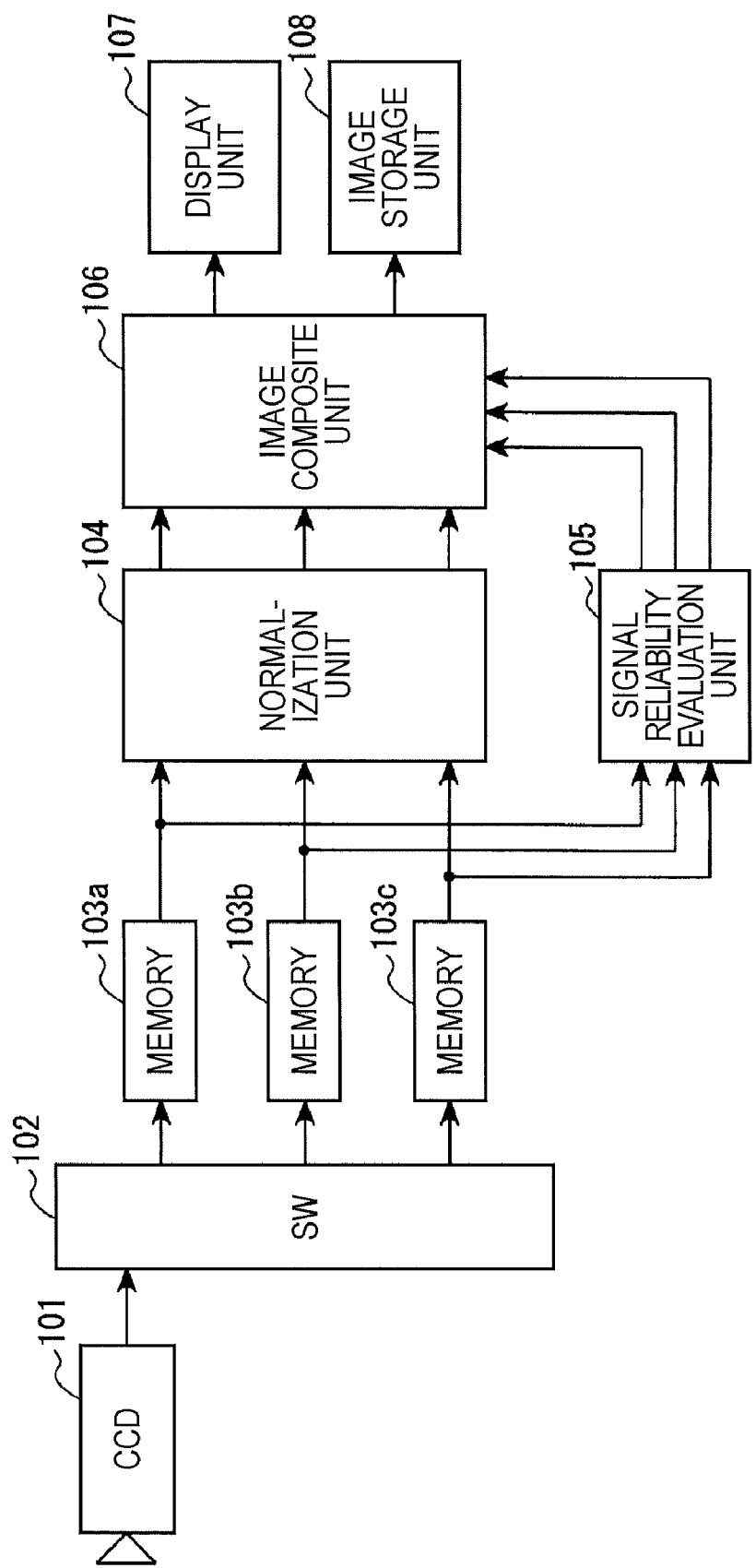
FIG. 1 is a diagram for explaining a configuration of an image processor according to Embodiment 1 of the invention.

FIG. 1 is a diagram for explaining a configuration of an image processor according to Embodiment 1. The image processor shown in the drawing is the image processor which composes image data of plural images taken with different exposures to generate composed image data. The processor includes a CCD (Charged Coupled Device) camera 101 taking images with different exposures and acquiring image data of taken images. The image data acquired by the CCD camera 101 includes image data of plural color components. In Embodiment 1, the image data includes three color components of R, G and B, and the image data is acquired according to each color component.

The image processor of Embodiment 1 also includes a signal reliability evaluation unit 105 evaluating the reliability of image data having different exposures according to image data having plural color components included in the image data, and an image composite unit 106 selecting image data of each color component from any of image data of plural images having different exposures, composite the selected image data of respective color components to generate composed image data.

The image processor of Embodiment 1 includes memories 103a, 103b and 103c respectively accumulating respective image data of R, G and B. The image data of R, G and B acquired by the CCD camera 101 is separated according to each color component by a switch (SW) 102 to be accumulated in any of the memories 103a to 103c. The image processor also includes a normalization unit 104 reading respective accumulated image data and normalizing the data, a display unit 107 such as a display displaying composed image data generated as a result of being composed by the image composite unit 106 and an image storage unit 108 storing the composed image data.

The signal reliability evaluation unit 105 evaluates the reliability of image data before being normalized by the normalization unit 104. The image composite unit 106 composes image data after being normalized.

In the above configuration, the CCD camera 101 functions as an image data acquisition unit, the signal reliability evaluation unit 105 functions as a reliability evaluation unit and the image composite unit 106 functions as a color selection unit and a composite unit. The normalization unit 104 functions as a normalization unit in Embodiment 1.

Hereinafter, respective configurations shown in FIG. 1 will be explained in more detail.

The CCD camera 101 generates plural image data acquired by taking the same subject to be taken with different exposures. In Embodiment 1, image data A, B and C having different exposures are generated by changing exposure time. An exposure time T1 of the image data A, an exposure time T2 of the image data B and an exposure time T3 of the image data C have the relationship of T1<T2<T3, and

T1:T2:T3=2:3:6.

The CCD camera 101 generates image data A, B and C by taking the same subject to be taken with different exposures. The CCD camera 101 is an imaging unit including a photo-electric conversion device (CCD) converting a received analog signal into an electrical signal and outputting it.

In Embodiment 1, a luminance signal level outputted by the CCD camera 101 is referred to as a pixel value and data in which the pixel value is associated with pixel coordinates in the image having the pixel value is referred to as image data. That is, the image data is data prescribed by the pixel coordinates and the luminance signal level.

Here, a configuration of the CCD camera 101 which takes the same subject to be taken with different exposure time will be explained with reference to FIG. 2.

Figure 2:
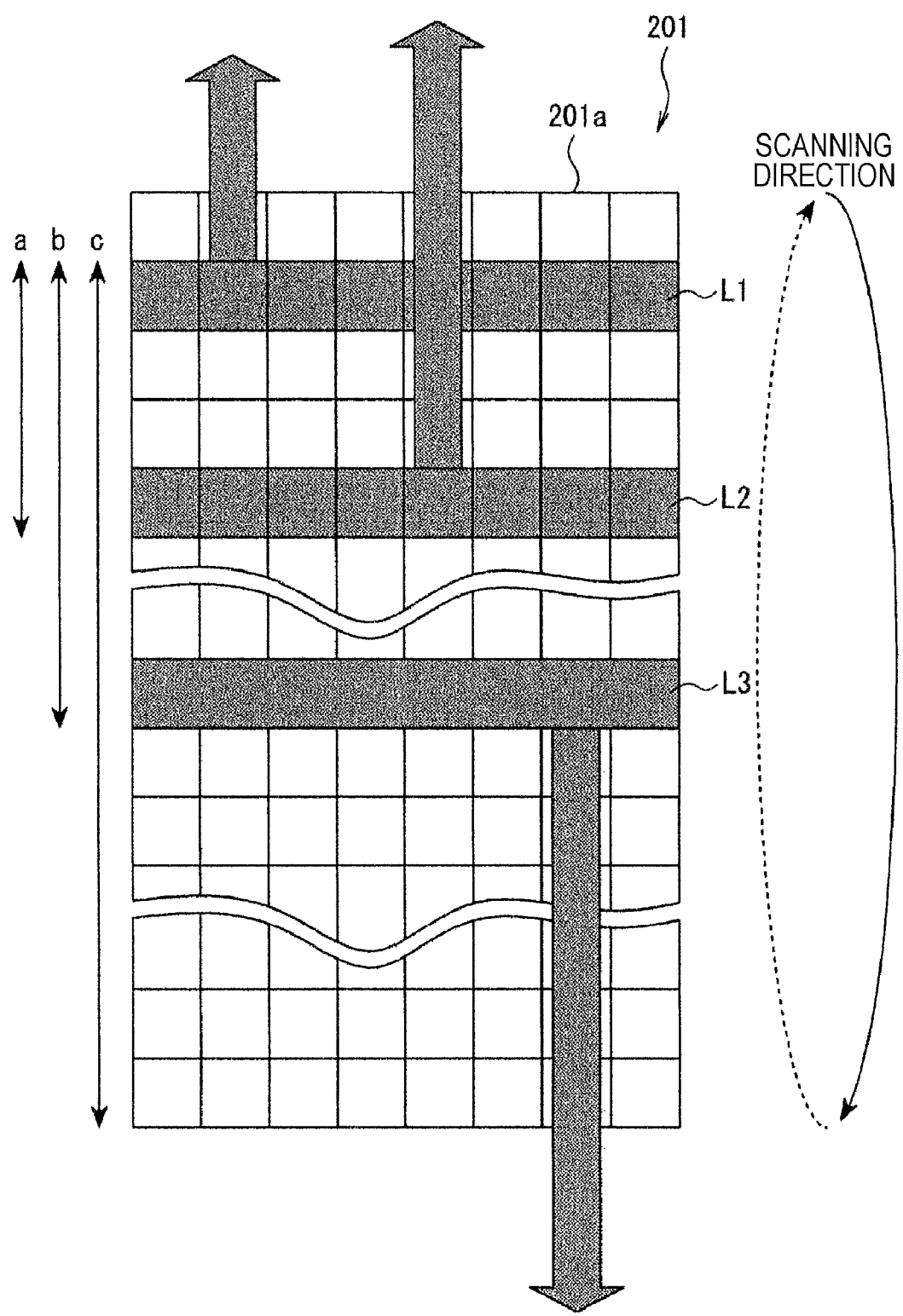
FIG. 2 is a view showing a sensor cell array mounted on a CCD camera shown in FIG. 1.

FIG. 2 is a view showing a sensor cell array 201 including CCDs 201a mounted on the CCD camera 101. In an exposure area of the sensor cell array 201, three readout lines L1, L2 and L3 reading charges accumulated in the CCD 201a are provided. The CCDs 201a are repeatedly scanned in a scanning direction shown in the drawing and accumulated charges are read out.

The readout line L1 is the readout line reading charges accumulated in the largest number of CCDs as well as resetting charges. The readout with resetting is also referred to as destructive readout. Data of charges read out by the readout line L1 is inputted to an A/D converter through a not-shown AFE (Analog Front End) to be digital data (image data). The image data based on data of charges read out by the readout line L1 will be the image data C whose exposure time is the longest in Embodiment 1.

Image data read out by the readout line L2 will be the image data B having standard exposure time in Embodiment 1. The readout line L3 is the readout line reading charges accumulated in the smallest number of CCDs. The image data read out by the readout line L3 will be the image data A whose exposure time is the shortest in Embodiment 1. Both the readout by the readout lines L2 and L3 are non-destructive readout without resetting.

During one exposure period, the readout and resetting of charges by the readout line L1 and non-destructive readout by the readout lines L2, L3 are executed independently.

The control of readout timing is realized by an electronic shutter function. However, Embodiment 1 is not limited to the above configuration and it is also preferable to apply a configuration in which the exposure is changed by controlling a diaphragm of the CCD camera 101.

In Embodiment 1, luminance signal levels of the normalized image data A, B and C are respectively A_NT3 (x, y, R), B_NT3 (x, y, R), and C_NT3 (x, y, R), and luminance signal levels before normalization of the image data A, B, and C are respectively A_T1 (x, y, R), B_T2 (x, y, R) and C_T3 (x, y, R). Every A_NT3 (x, y, R), B_NT3 (x, y, R), C_NT3 (x, y, R), A_T1 (x, y, R), B_T2 (x, y, R) and C_T3 (x, y, R) shows the image data of R in R, G and B. Variables "x, y" show coordinates of a pixel which has the luminance signal level. The relationship among A_NT3 (x, y, R), B_NT3 (x, y, R), C_NT3 (x, y, R), A_T1 (x, y, R), B_T2 (x, y, R) and C_T3 (x, y, R) is represented by the following formulas.

$$A\_NT3\ (x, y, R) = A\_T1\ (x, y, R) \times (T3/T1)$$

$$B\_NT3\ (x, y, R) = B\_T2\ (x, y, R) \times (T3/T2)$$

$$C\_NT3\ (x, y, R) = C\_T3\ (x, y, R)$$

The above formulas are written with respect to the R component of the image data A, B and C, and they are effected in the same manner with respect to the G component and B component.

Figure 3:
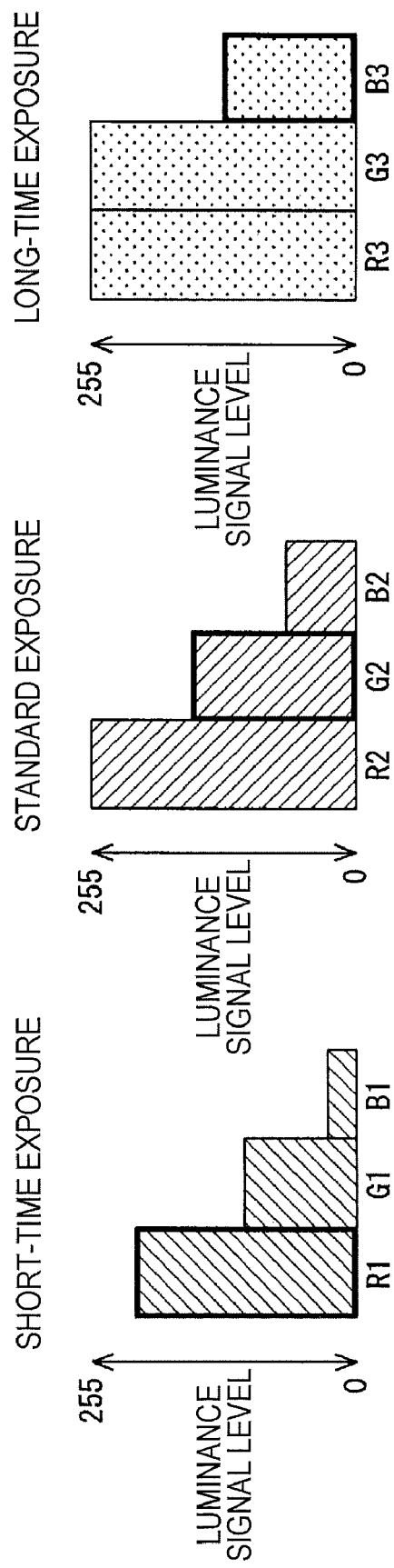
FIG. 3A, FIG. 3B and FIG. 3C are graphs showing image data of respective color components of R, G and B forming orange in the image data of images taken by the CCD camera shown in FIG. 1.

FIG. 3A, FIG. 3B, FIG. 3C, FIG. 4A, FIG. 4B, FIG. 4C and FIG. 5 are graphs for explaining a method of evaluating the reliability of luminance signal levels of image data performed by the signal reliability evaluation unit 105 of Embodiment 1. FIG. 3A, FIG. 3B and FIG. 3C show image data of respective color components of R, G and B forming orange in the image data in which the same subject to be taken is taken by the CCD camera 101. FIG. 3A shows image data A of an image taken with the shortest exposure time T1, FIG. 3B shows image data B of an image taken with the exposure time T2 and FIG. 3C shows image data C of an image taken with the longest exposure time T3. The vertical axis shows the luminance signal level of the image data. In the horizontal axis, respective color components of the image data are shown in parallel.

In Embodiment 1, since the S/N ratio of the signal is large, higher reliability is applied to higher luminance signal level. However, when the signal level is too high and reaches the maximum value 255 (saturated), it is difficult to obtain the accurate signal level. Accordingly, the maximum value of the reliability is applied to a luminance signal level which is slightly lower than 255 (for example, 224) in Embodiment 1.

The above application of the reliability can be realized by substituting a luminance signal level into a formula previously set, or by referring to a LUT (Look UP Table). Formulas for calculating the reliability E_T1 (x, y, R) when the luminance signal level of the image data A_T1 (x, y, R) is 224 or more are shown as an example.

if $A\_T1\ (x, y, R) > 224$ then $E\_T1\ (x, y, R) = (255 - A\_T1\ (x, y, R))/31$ else $E\_T1\ (x, y, R) = A\_T1\ (x, y, R)/224$ The above formulas are written with respect to the R component in the image data A, B and C, and they are effected in the same manner with respect to the G component and B component.

A numeral "31" in the formula is the difference between the luminance signal level 224 obtaining the maximum value of the reliability and the maximum value of the luminance signal level 255. The difference between 255 and luminance signal level 224 and the luminance signal level of luminance is divided by the difference between the luminance signal level 224 and the maximum value of the luminance signal level 255, thereby setting the reliability to decrease when the luminance signal level of the image data A_T1 (x, y, R) comes close to a saturated value.

The above formula of the reliability evaluation is not limited to this form, and it is preferable that any form of formula can be used as long as it will be an index for the reliability of the luminance signal level considering noise or output characteristics. In addition, the evaluation of the reliability is not limited to the formula but may be performed by using the predetermined LUT and the like.

When evaluating luminance signal levels shown in FIG. 3A, FIG. 3B and FIG. 3C by the above formulas, R1 of the R component of the image data A shown in FIG. 3A obtains higher reliability than R2, R3 which are R components of the image data B, C with respect to the R component in R, G and B. Concerning the G component, G2 of the G component of the image data B shown in FIG. 3B obtains higher reliability than G1, G3 which are G components of the image data A, C. Further, concerning to the B component, B3 of the B component the image data C shown in FIG. 3C obtains higher reliability than B1, B2 which are the G components of the image data A, B.

In Embodiment 1, the signal reliability evaluation unit 105 executes evaluation of the reliability as described above, outputting the reliability to the image composite unit 106. The image composite unit 106 selects image data whose reliability is highest in the image data A, B and C with respect to each of image data R, G and B. Then, the selected image data are composed to generate composed image data displaying orange.

Figure 4:
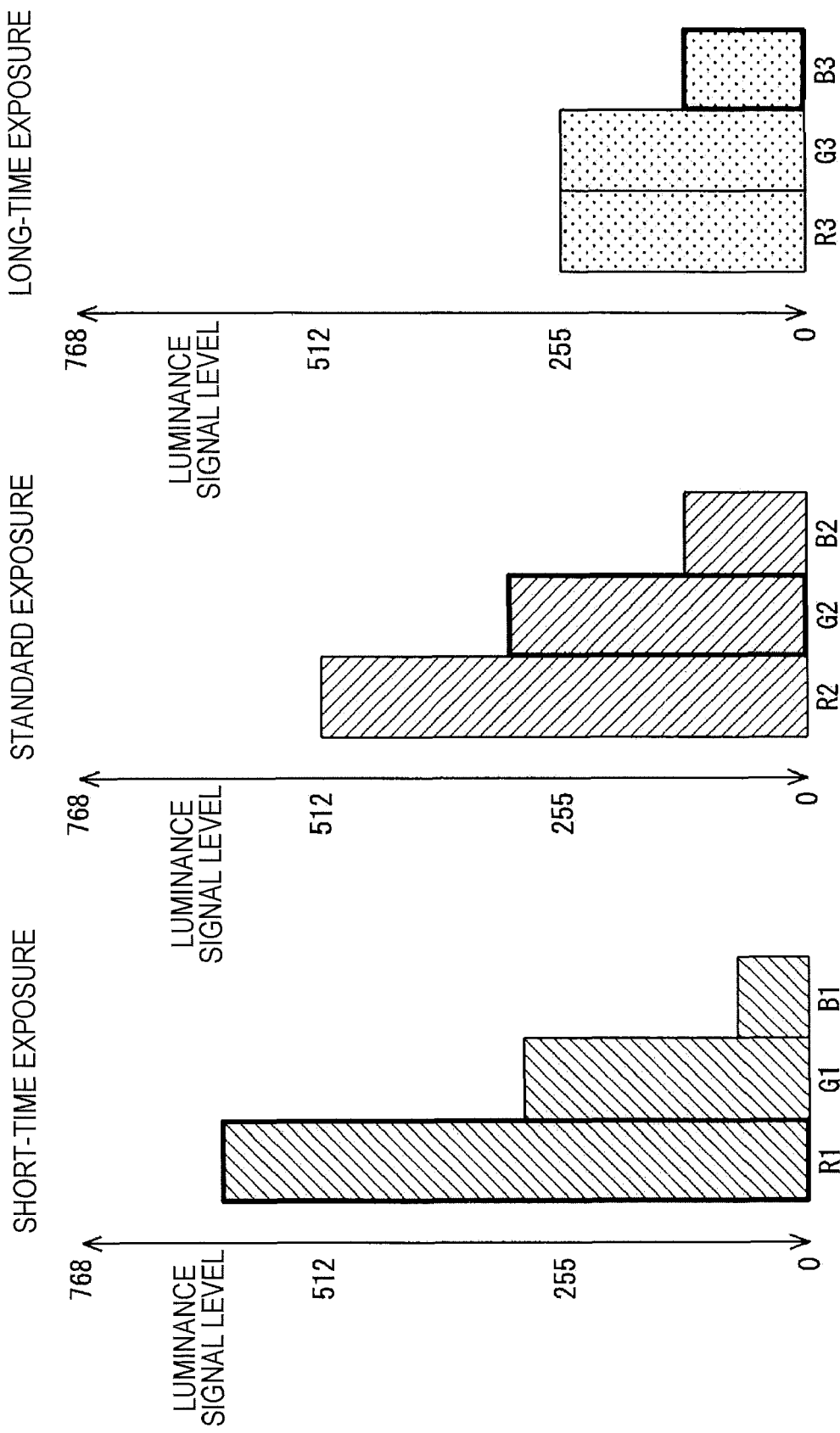
FIG. 4A, FIG. 4B and FIG. 4C show graphs for explaining luminance signal levels normalized by a normalization unit shown in FIG. 1.
Figure 5:
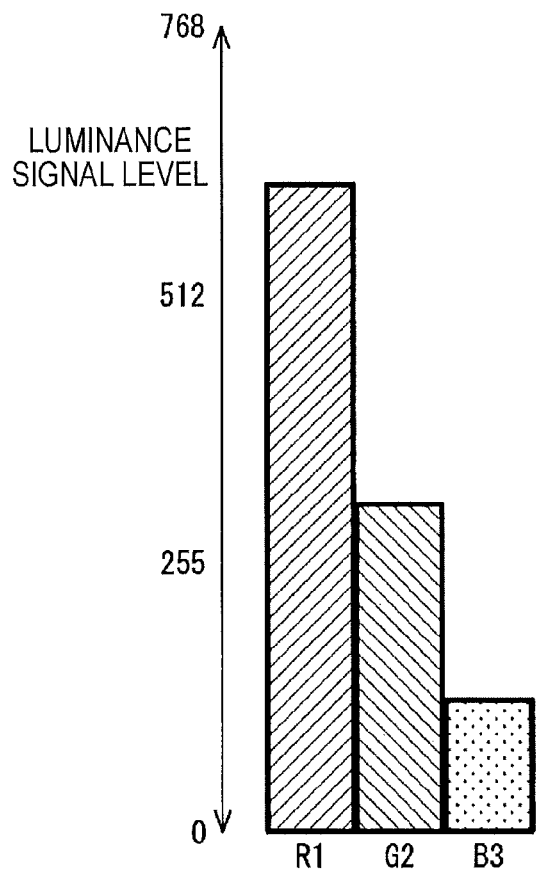
FIG. 5 is a graph showing composed image data composed by an image composite unit shown in FIG. 1.

In Embodiment 1, the normalization unit 104 normalizes luminance signal levels of the image data A, B and C in parallel with the evaluation of the reliability described above. FIG. 4 are graphs for explaining the normalized luminance signal levels. The image composite unit 106 generates composed image data of orange by composite R1, G1 and B3 components of the image data shown in FIG. 4A, FIG. 4B and FIG. 4C. The composed image data is shown in FIG. 5.

Figure 6:
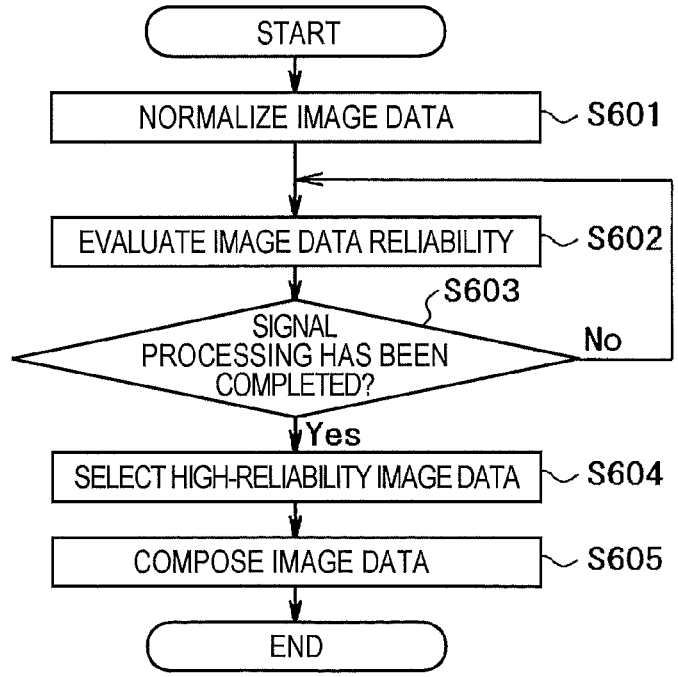
FIG. 6 is a flowchart for explaining an image processing program performed in the image processor according to Embodiment 1 of the invention.

FIG. 6 is a flowchart for explaining an image processing method and an image processing program performed in the image processor of the above-described Embodiment 1. In the image processor of Embodiment 1, the normalization unit 104, the signal reliability evaluation unit 105, and the image composite unit 106 are functions which are respectively realized by a computer. The shown flowchart is for a program for allowing a computer to execute the functions of respective configurations.

The CCD camera 101 has acquired three image data A, B and C having difference exposure time, and respective image data is accumulated in the memories 103a, 103b and 103. The normalization unit 104 normalizes respective accumulated image data (S601).

The signal reliability evaluation unit 105 evaluates the reliability of the R component first in image data A, B and C, in parallel with the normalization (S602). Next, whether the reliability with respect to the G component and B component have been evaluated or not is determined (S603). When there is image data whose reliability evaluation has not been performed (S603:No), reliability evaluation is performed, evaluating the reliability of all of R, G and B (S603:Yes).

Next, the image composite unit 106 selects image data which has obtained the highest reliability by the evaluation of the signal reliability evaluation unit 105 with respect to respective components of R, G and B (S604). Then, image data which has been selected as well as normalized is composed (S605).

According to the Embodiment 1 described above, the signal reliability evaluation unit 105 can evaluate the reliability of image data of images taken with different exposures according to the color components. In addition, the image composite unit 106 can select image data of each color component from any of plural image data having different exposures based on the evaluated reliability to generate composed image data by composite image data of selected respective color components.

Accordingly, composed image data can be generated by applying luminance signal levels which are considered to be appropriate (highly reliable) with respect to respective color components of image data, therefore, composed image data having appropriate hue can be generated.

The image processing method of Embodiment 1 described above can be executed at a place where so-called print service is provided, which prints images by receiving data.

Embodiment 2

Figure 7:
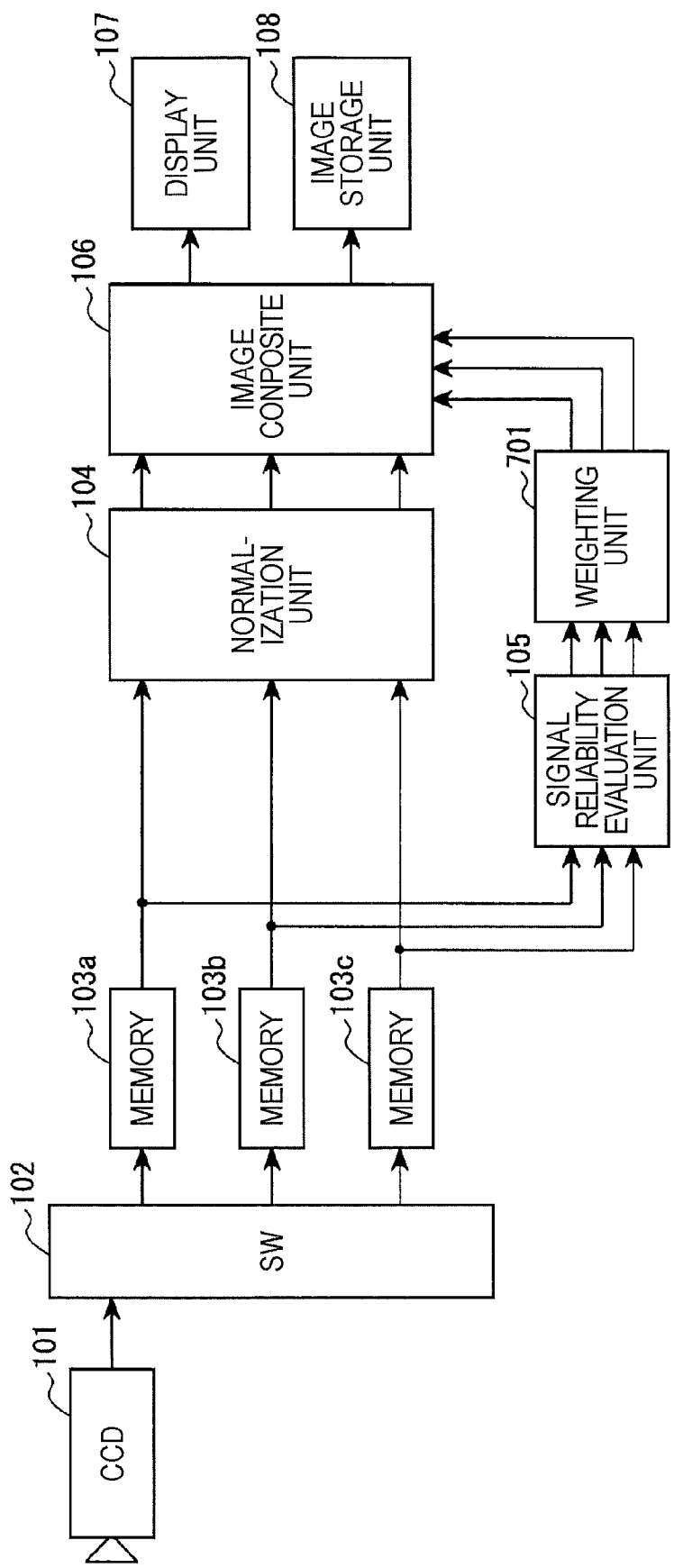
FIG. 7 is a diagram for explaining a configuration of an image processor according to Embodiment 2.

Next, Embodiment 2 of the invention will be explained. FIG. 7 is a diagram for explaining a configuration of an image processor according to Embodiment 2. In FIG. 7, the same signs are put to components which are the same as in FIG. 1, and explanation thereof is partially omitted.

The image processor according to Embodiment 2 includes the CCD camera 101, the switch 102, the memories 103a, 103b and 103c as is the case with Embodiment 1. The normalization unit 104, the signal reliability evaluation unit 105, the image composite unit 106, the display unit 107 and the image storage unit 108 are also provided.

In Embodiment 2, the image composite unit 106 selects image data of the same color component from respective plural image data having different exposures. The image processor according to Embodiment 2 includes a weighting unit 701 determining a mixing ratio of plural image data of the same color component selected by the image composite unit 106. The image composite unit 106 composes plural image data of the same color component in accordance with the determined mixing ratio.

Note that the weighting is a parameter indicating the mixing ratio determined based on the reliability of image data. The weighting unit 701 functions as a mixing ratio determining unit of Embodiment 2.

In Embodiment 1, each of R, G and B components is selected from one of the image data A, B and C, and image data of the selected R, G and B components are composed, whereas in Embodiment 2, it is different in a point that image data of respective components of R, G and B are selected from some of the image data A, B and C (in Embodiment 2, from all image data A, B and C), and image data of the same color component in the selected R, G and B components is mixed in accordance with the mixing ratio.

As the result of such mixing, the R component of image data can be composed by the R component of the image data A and the R components of image data B, C being mixed. Also, the G component of image data can be composed by the G component of the image data A and the G components of image data B, C being mixed, and the B component of image data can be composed by the B component of the image data A and B components of image data B, C being mixed. The respective components R, G and B obtained as the result of composite are composed with one another to be composed image data.

The weighting performed by the weighting unit 701 will be explained. In Embodiment 1, the weighing is performed by deciding a weighting factor. The weighting factor indicates the mixing ratio of the image data A, B and C, and the larger the weighting factor is, the higher the mixing ratio is.

A weighting factor W_T1 (x, y, R) of the R component of the image data A is calculated by, for example, the following formulas.

$$W\_T1\ (x, y, R)=E\_T1\ (x, y, R)/E\text{sum}$$

$$W\_T2\ (x, y, R)=E\_T2\ (x, y, R)/E\text{sum}$$

$$W\_T3\ (x, y, R)=E\_T3\ (x, y, R)/E\text{sum}$$

in which $$E\text{sum}=E\_T1\ (x, y, R)+E\_T2\ (x, y, R)+E\_T3\ (x, y, R)$$

The above formulas are written with respect to the R component of the image data A, B and C, and they are effected in the same manner with respect to the G component and B component.

The weighting factor calculated by the weighting unit 701 is outputted to the image composite unit 106. The image composite unit 106 inputs the weighting factor, multiplying respective components of the image data A, B and C by the inputted weighting factor. Then, luminance signal levels after multiplication are composed to calculate composed image data.

$$\text{Image composed data}=W\_T1\ (x, y, R)\times A\_NT3\ (x, y, R)+W\_T2\ (x, y, R)\times B\_NT3\ (x, y, R)+W\_T3\ (x, y, R)\times C\_NT3\ (x, y, R)$$

Figure 8:
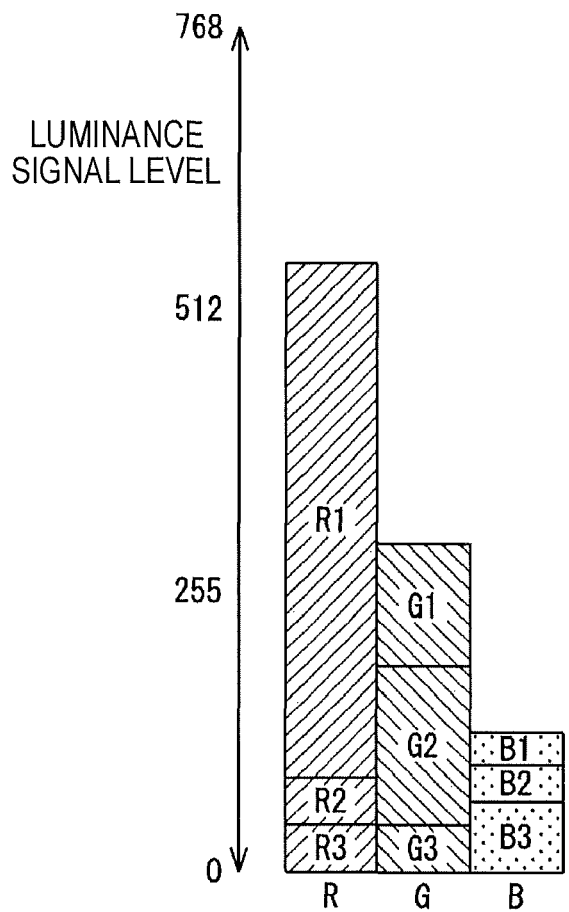
FIG. 8 is a graph showing the mixing ratio of the composed image data composed by the image composite unit according to Embodiment 2 of the invention.
Figures 9A, 9B:
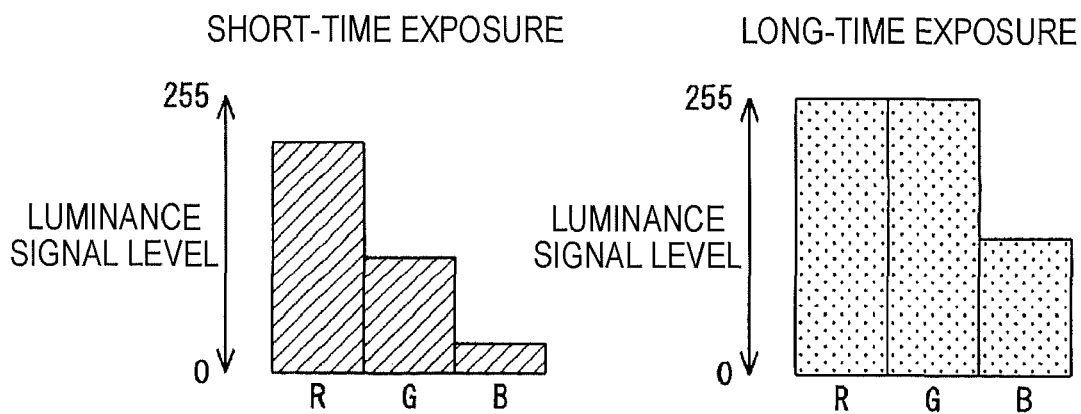
FIG. 9A and FIG. 9B are graphs for explaining deterioration of the chroma in general in the image composite.

FIG. 8 is a graph showing the mixing ratio of the image composed data composed by the image composite unit 106. The shown composed image data includes three components R, G and B in R, G, and B components of all image data A, B and C.

Embodiment 2 generates one color component of image data by mixing plural image data. Therefore, a component which has a low luminance signal level and is liable to be affected by noise (B component in the drawing) and a B component of another image data whose effect by noise is smaller are used to generate the B component of the composed image data. Embodiment 2 is not liable to be affected by noise when comparing with the case that the B component of the composed image data is generated by using only the B component which has the low luminance signal level and is liable to be affected by noise.

The entire disclosure of Japanese Patent Application No. 2007-103668 filed on Apr. 11, 2007 is expressly incorporated by reference herein.

What is claimed is:

1. An image processor generating composed image data by composite image data of plural images taken with different exposures, comprising:
   an image data acquisition unit that acquires image data of images taken with different exposures;
   a reliability evaluation unit that evaluates the reliability of image data having different exposures acquired by the image acquisition unit, in which the image data acquired by the image acquisition unit includes image data of plural color components, according to image data of plural color components included in the image data;
   a color selection unit that selects image data of each color component from any of image data of plural images having different exposures based on the reliability obtained as a result of evaluation by the reliability evaluation unit; and
   a composite unit that generates the composed image data by composite image data of respective color components selected by the color selection unit in the image data.

2. The image processor according to claim 1,
   wherein the color selection unit selects image data of the same color component from respective image data having different exposures based on the reliability obtained as a result of evaluation by the reliability evaluation unit, and further comprising:
   a mixing ratio determining unit that determines the mixing ratio of plural image data of the same color component selected by the color selection unit, and
   wherein the composite unit composes plural image data of the same color component in accordance with the mixing ratio determined by the mixing ratio determining unit.

3. The image processor according to claim 1, further comprising:
   a normalization unit that normalizes image data of respective color components acquired by the image data acquisition unit, and
   wherein the composite unit composes image data normalized by the normalization unit.

4. An image processing method generating composed image data by composite image data of plural images taken with different exposures, comprising:
   using an image data acquisition unit for performing an image data acquisition step of acquiring image data of images taken with different exposures;
   a reliability evaluation step of evaluating the reliability of image data having different exposures acquired by the image acquisition step, in which the image data acquired by the image acquisition step includes image data of plural color components, according to image data of plural color components included in the image data;
   a color selection step of selecting image data of each color component from any of image data of plural images having different exposures based on the reliability obtained as a result of evaluation by the reliability evaluation step; and
   a composite step of generating the composed image data by composite image data of respective color components selected by the color selection step in the image data.

5. A computer readable medium for an image processing program for allowing a computer to perform image processing generating composed image data by composite image data of plural images taken with different exposures, which allows the computer to execute
   an image acquisition function acquiring image data of images taken with different exposures,
   a reliability evaluation function evaluating the reliability of image data having different exposures acquired by the image acquisition function, in which the image data acquired by the image acquisition function includes image data of plural color components, according to image data of plural color components included in the image data,
   a color selection function selecting image data of each color component from any of image data of plural images having different exposures based on the reliability obtained as a result of evaluation by the reliability evaluation function, and
   a composite function generating the composed image data by composite image data of respective color components selected by the color selection function in the image data.

* * * * *